G. W. LORIMER.
AUTOMATIC TAKE-UP REEL.
APPLICATION FILED APR. 20, 1911.
1,131,069.
Patented Mar. 9, 1915.
2 SHEETS—SHEET 1.
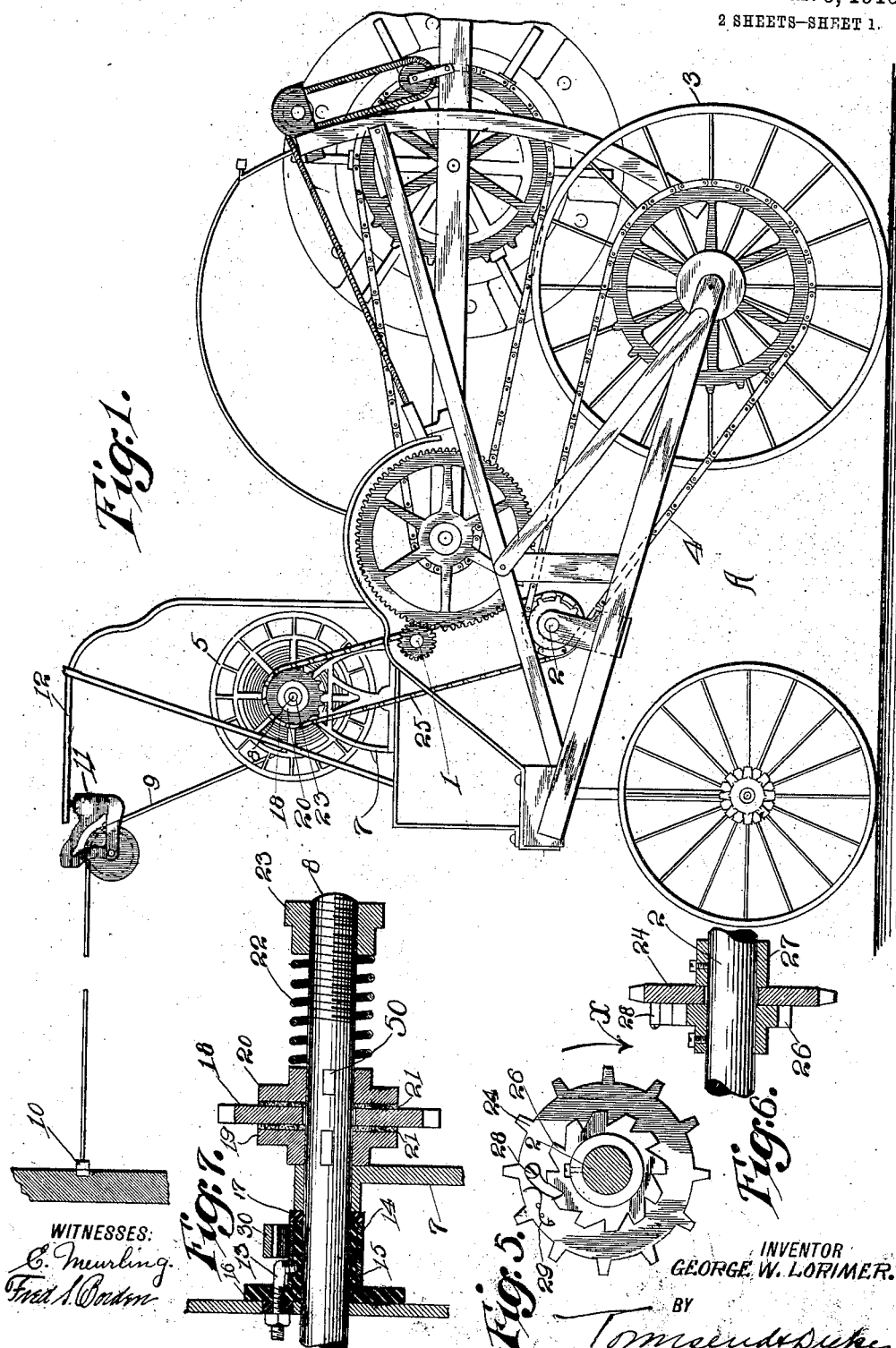
WITNESSES:
INVENTOR
GEORGE W. LORIMER.
BY
ATTORNEYS G. W. LORIMER.
AUTOMATIC TAKE-UP REEL.
APPLICATION FILED APR. 20, 1911.
1,131,069.
Patented Mar. 9, 1915.
2 SHEETS—SHEET 2.
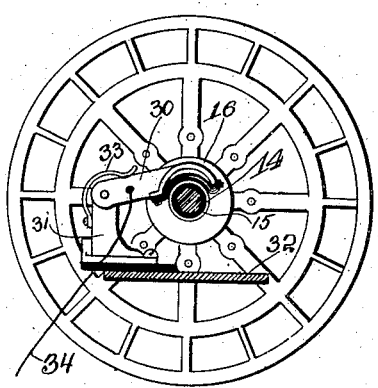
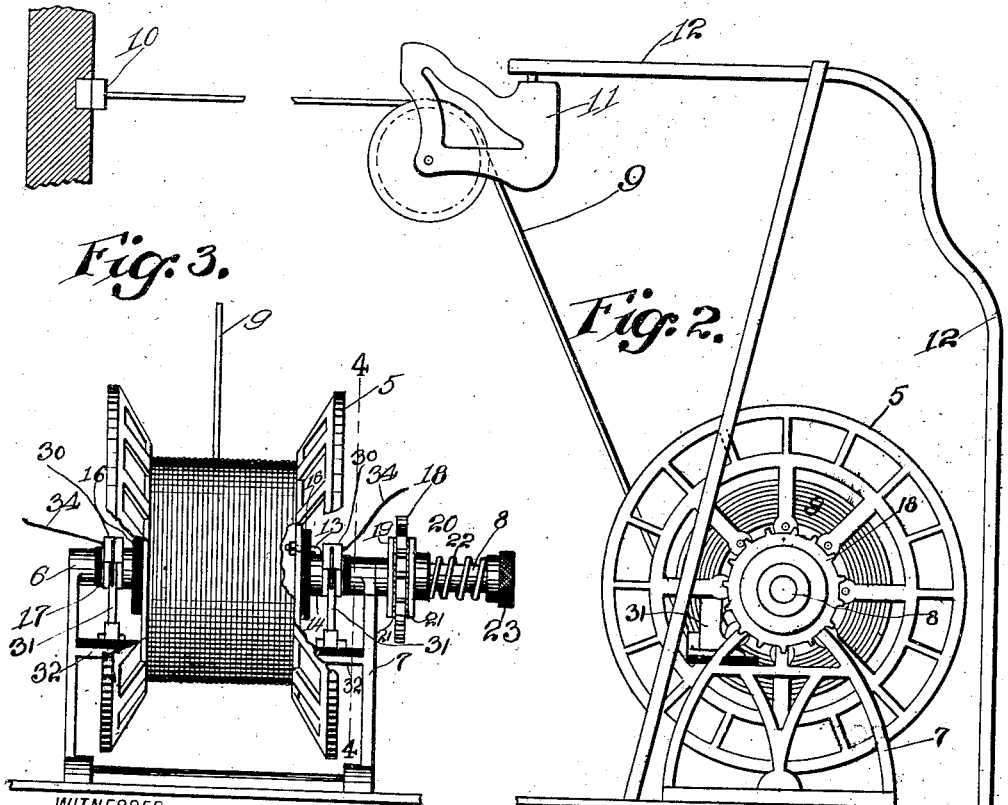
WITNESSES:
INVENTOR
GEORGE W. LORIMER.
BY
ATTORNEYS

UNITED STATES PATENT OFFICE.

GEORGE W. LORIMER, OF PIQUA, OHIO, ASSIGNOR TO SAND MIXING MACHINE COMPANY, OF GREENFIELD, OHIO, A CORPORATION OF OHIO.

AUTOMATIC TAKE-UP REEL.

1,131,069.  Specification of Letters Patent.  Patented Mar. 9, 1915.

Application filed April 20, 1911.  Serial No. 622,195.

*To all whom it may concern:*

Be it known that I, GEORGE W. LORIMER, a citizen of the United States, and a resident of Piqua, in the State of Ohio, have invented certain new and useful Improvements in Automatic Take-Up Reels, of which the following is a specification.

My invention relates to take-up reels for automatically paying out and taking up an electric or other cable in such manner that the cable will always be kept under tension.

The reel is particularly useful for winding up and paying out a flexible conductor which may be attached at one end to a source of electric current such as a wall socket, the other end being carried by the reel, and which serves to supply current to a movable carriage or vehicle to drive the same or for other purposes.

An object of the invention is to provide improved and simplified means for taking up and paying out a flexible conductor carried by a reel which travels bodily about a floor or other area whereby the conductor or cable is maintained under tension.

The invention will be shown and described as applied to an electric motor driven machine for cutting and mixing sand operating by traveling over the sand heaps located on the floor of a foundry. As the machine or carriage necessarily has to operate on different parts of the floor at various times and must at times travel through an irregular course, it is impractical to conduct the current for operating the motor from a fixed trolley wire as in the case of traction systems. By practising this invention the electric current for driving the carriage is taken through a flexible cable or conductor which at one end is plugged into a wall socket or other suitable source of current supply, the other end being secured to the reel mounted upon and carried by the machine in its travel and having mechanism connected therewith for operating the reel, whereby the cable is automatically taken up and paid out by the reel in such manner that the cable is always kept under tension while the machine is traveling, thus keeping it off the floor and free from entanglement.

While the invention is shown as carried into effect with a machine of the above type, it will be understood that this use is for the purposes of illustration only and the invention is not limited thereto, as it may be employed for various other uses without departing from the spirit thereof and it will be understood that all such other uses to which the invention is applicable are intended to be covered in the appended claim.

The invention consists in the improved automatic take-up reel and the means for operating the same as well as the novel parts, combinations of parts and details of construction hereinafter more particularly described and then specified in the claim.

In the accompanying drawings, Figure 1 illustrates a side elevation of a traveling sand cutting and mixing machine equipped with my invention. Fig. 2 is an enlarged side elevation of the take-up reel. Fig. 3 is a front elevation of the same. Fig. 4 is a transverse section taken on the line 4, 4 Fig. 3. Fig. 5 is an enlarged side elevation of the driving sprocket for the reel. Fig. 6 is a central vertical section through the detail shown in Fig. 5. Fig. 7 is an enlarged section through the reel commutator and the reel sprocket.

In the drawings A indicates a traveling sand cutting and mixing machine of the general type set forth in my prior patent for sand cutting machine No. 973,523, dated October 25, 1910, except that the machine in the present case is driven by means of an electric motor, whereas in the patent a gasolene engine for driving the machine is shown.

In the present case the electric motor (not shown) is mounted on the frame of the machine, the end of the motor shaft being indicated at 1. The motor shaft 1 is suitably geared to a counter or traction shaft 2 which in turn drives the wheels 3 of the carriage through suitable sprocket chains 4 and also rotates the cable reel as will be hereafter described. The shaft 2 is driven forward or reverse by suitable gearing or otherwise to propel the carriage in either direction desired.

5 indicates the cable reel secured to a shaft 8 suitably mounted to rotate in journals formed in brackets or standards 6, 7 secured to and rising from the frame of the machine. The flexible conductor or cable 9 is detachably attached at one end to a source of current supply such as the wall socket 10 and passes through a swivel guide 11 carried by a bracket 12 to the drum of the reel 5.

This end of the cable is bared and the wires attached to binding posts 13, preferably one on either side of the reel, which pass through the side plates of the reel and are secured to commutators 14 carried by the reel shaft 8. The binding posts are suitably insulated from the reel as shown, the commutators being also insulated from the shaft by insulation bushings 15 and washers or plates of insulating material 16, 17.

18 indicates a sprocket wheel preferably loosely mounted on the reel shaft 8 and held between collars or disks 19, 20, the disk 19 being keyed or otherwise secured to the shaft 8. Washers 21 of any suitable compressible material such as leather are superimposed on each side of the sprocket 18 between it and the collars 19 and 20. The collar 20 preferably has a more or less free longitudinal movement on the shaft 8, but is held from independent circular movement by a feather 50, while the collar 19 is rigidly held thereon, the collar 20 being pressed against the sprocket 18 by a compression spring 22 held compressed between the collar and a nut 23 threaded on the end of the shaft 8. On rotating the sprocket 18 the reel shaft 8 is driven through the frictional engagement of the sprocket and collars 19 and 20, the spring 22 exerting a more or less pressure due to the regulation of the nut 23. By this device a more or less slip is provided between the driving sprocket 18 and the driven shaft 8 for purposes hereafter set forth.

24 indicates a sprocket wheel loosely mounted on the traction shaft 2 and connected to the sprocket 18 on the reel shaft by a sprocket chain 25. The sprocket 24 is held from longitudinal displacement on the shaft between a ratchet disk 26 fast on the shaft 2 and a collar 27 suitably secured to said shaft. A pawl 28 pivoted on the side of the sprocket 24 engages the teeth of the ratchet 26, a spring 29 keeping the same pressed against said teeth. On rotation of the shaft 2 in one direction the ratchet and pawl connect the sprocket 25 to the shaft 2 and the reel is rotated through the chain 25, sprocket 18 and friction clutch on the reel shaft 8. On rotation of the shaft 2 in the reverse direction the pawl 28 merely clicks over the teeth on the ratchet 26 and the sprocket 24 remains free of the shaft 2.

The sprockets 24 and 18 are preferably so designed that they tend to rotate the reel 5 faster than the driving wheels 3 of the carriage are driven, thus at all times keeping the cable 9 under tension. It will be noted that the reel 5 is positively driven in one direction by the pawl and ratchet connection but when the carriage travels in the reverse direction the reel is uncoupled from the driving power and capable of loose rotation in the bearings of the shaft 8.

30 indicates a movable arm preferably pivotally mounted on a bracket 31 supported on but insulated from a platform 32 projecting from the reel standards 6, 7. The arm 30 is provided with a semi-circular cavity in its free end and in said cavity is mounted flexible metallic sheets such as for instance wire gauze of very fine mesh. The arm 30 is pressed in the direction of the commutator 14 by a spring 33, thereby pressing the wire gauze into engagement with the periphery of the commutator. The gauze makes contact with the commutator over the plane surface of the gauze which conforming itself to the periphery of the commutator and owing to the cavity in the arm makes a generally semi-circular contact with said commutator. This construction gives a large contact surface and permits an equally perfect connection irrespective of the direction of rotation of the reel, and therefore the commutator, as well as preventing clicking and jumping of the brush when the commutator is rotating backward. Conductors 34 secured to the brushes 30 carry current in any suitable manner to the motor for driving the carriage.

The operation of the take-up reel it is thought is obvious. The carriage A being caused to travel in a forward direction, the traction shaft 2 rotates in the direction of the arrow X Fig. 5. On rotation in this direction the reel is coupled to the driving mechanism and winds up the cable 9. On causing the carriage to travel backward, the traction shaft rotates in the reverse direction and the pawl merely clicks over the teeth on the ratchet and the reel is free from the driving mechanism, the cable unwinding merely by the pull of the carriage. When winding up the cable the reel tending to rotate faster than the driving wheels 3, more or less pull is exerted on the cable, which causes a slip to occur between the sprocket 18 and collars or disks 19, 20 and prevents the plug being pulled out from the wall socket 10, the amount of slip however being so adjusted or regulated by the nut 23 that the cable still remains taut or under tension. The amount of slip or friction in the clutch can be thus adjusted for the different lengths of cable which may be employed and therefore the different amount of pull required to keep it taut.

It will be understood that my invention is not limited to the various details of construction and operation shown and described but various modifications and equivalents of the same may be resorted to without departing from the spirit of the invention and all such modifications and equivalents are intended to be included in the appended claim.

What I claim as my invention is:

In an apparatus of the class described, the combination of a movable carriage and its driving mechanism, a shaft mounted on said carriage, a reel fixed on said shaft, a flexible cable having one end secured at a fixed point and the other connected to said reel, a counter shaft driven by said driving mechanism, a sprocket wheel loose on said reel shaft, a pawl and ratchet device on said counter shaft, means for driving said sprocket wheel from said counter shaft through said pawl and ratchet device, a pair of friction disks keyed to said reel shaft and between which said sprocket wheel is held and a spring tension device for coupling said sprocket wheel to said reel shaft.

Signed at Piqua in the county of Miami and State of Ohio this 15th day of April, A. D. 1911.

GEORGE W. LORIMER.

Witnesses:
GEORGE A. VAUGIER,
EDWARD R. CAVEN.